No. 768,269. PATENTED AUG. 23, 1904.
C. G. LUNDBORG, DEC'D.
H. CLARK, ADMINISTRATRIX.
CONSTRUCTION OF SHIPS.
APPLICATION FILED OCT. 9, 1902.
NO MODEL.
4 SHEETS—SHEET 1.
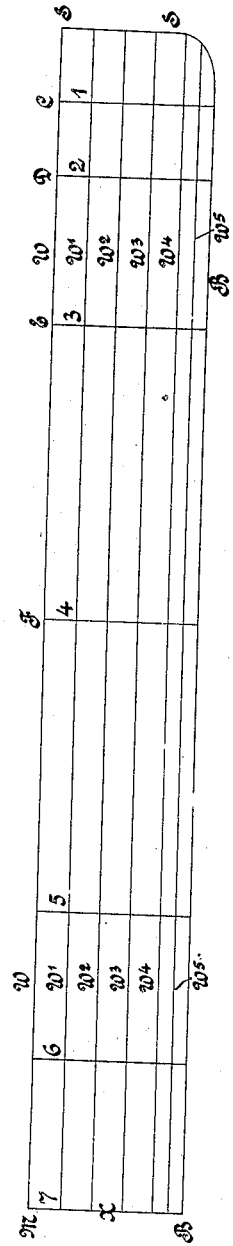
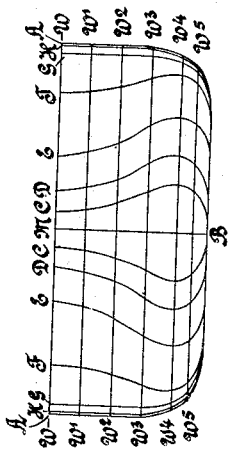
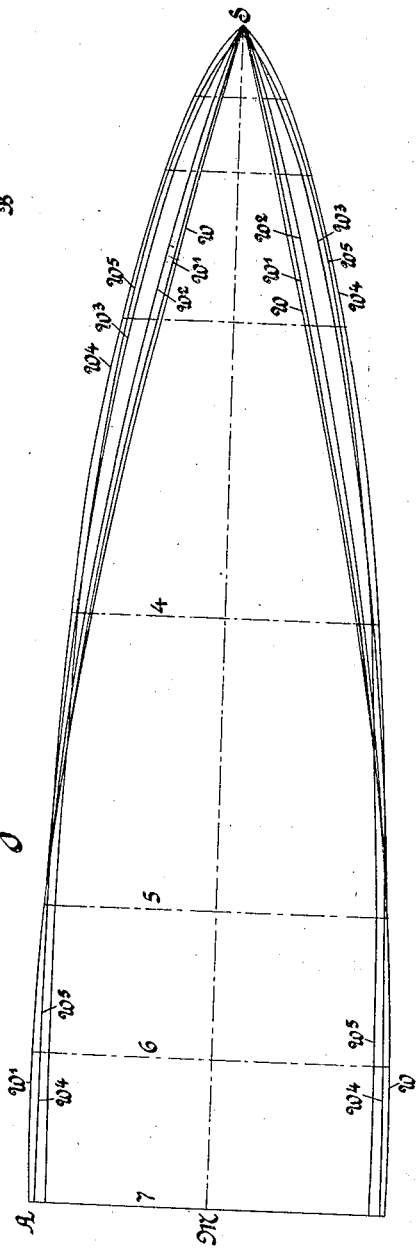
Witnesses:
Max B. A. Doring
Joseph H. Jacobs
Inventor:
Helen Clark
Admix of Charles G. Lundborg Dec'd
By her Attorney No. 768,269. PATENTED AUG. 23, 1904.
C. G. LUNDBORG, DEC'D.
H. CLARK, ADMINISTRATRIX.
CONSTRUCTION OF SHIPS.
APPLICATION FILED OCT. 9, 1902.
NO MODEL. 4 SHEETS—SHEET 2.
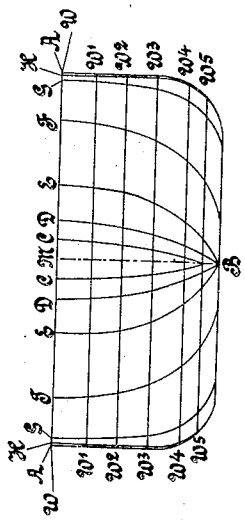
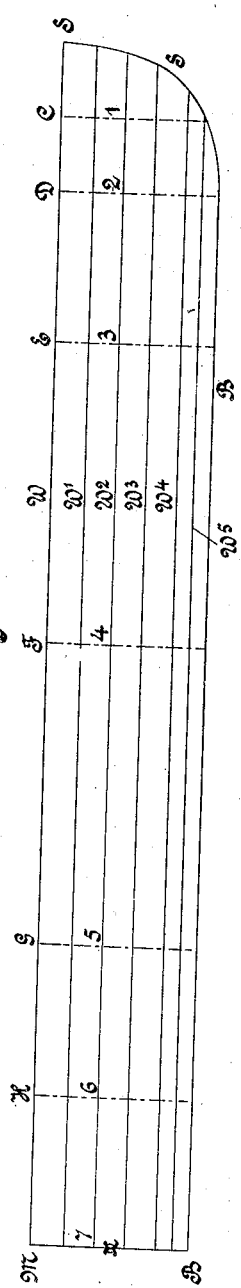
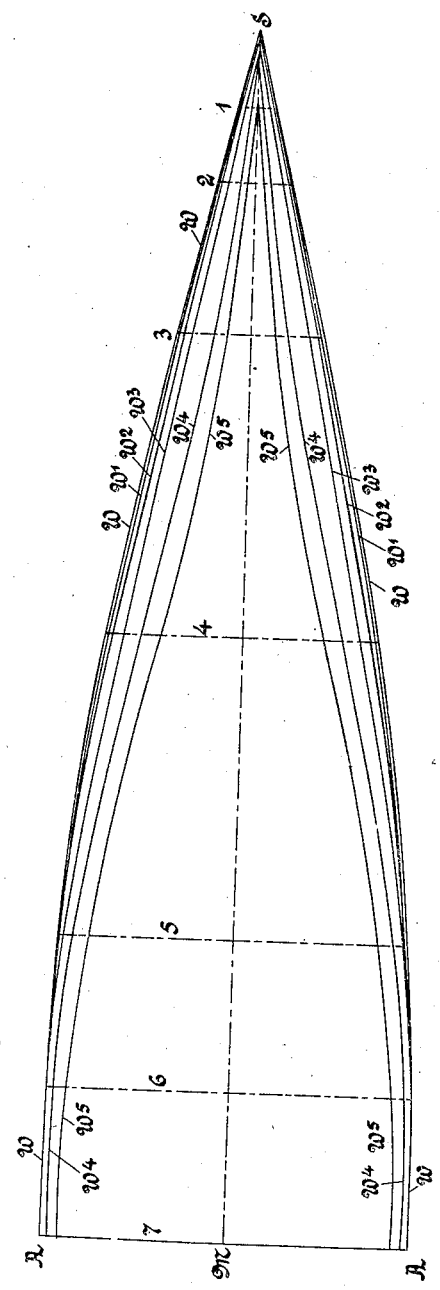
Witnesses:
Max B. A. Doring.
Joseph J. Jacobs
Inventor:
Helen Clark
Admx of Charles G. Lundborg Dec'd
By her Attorney No. 768,269. PATENTED AUG. 23, 1904.
C. G. LUNDBORG, DEC'D.
H. CLARK, ADMINISTRATRIX.
CONSTRUCTION OF SHIPS.
APPLICATION FILED OCT. 9, 1902.
NO MODEL.
4 SHEETS—SHEET 3.
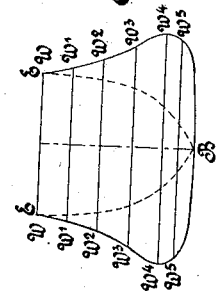
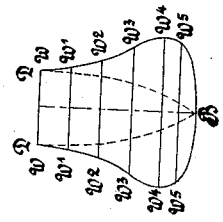
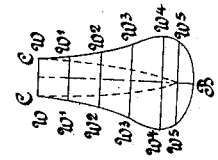
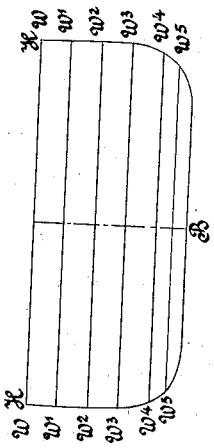
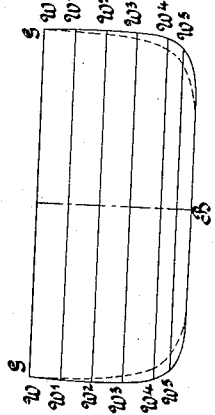
Witnesses:
Max B. A. Doring
Joseph J. Jacobs
Inventor:
Helen Clark
Adm'x of Charles G. Lundborg, Dec'd
By her Attorney:

No. 768,269. PATENTED AUG. 23, 1904.
C. G. LUNDBORG, DEC'D.
H. CLARK, ADMINISTRATRIX.
CONSTRUCTION OF SHIPS.
APPLICATION FILED OCT. 9, 1902.
NO MODEL. 4 SHEETS—SHEET 4.
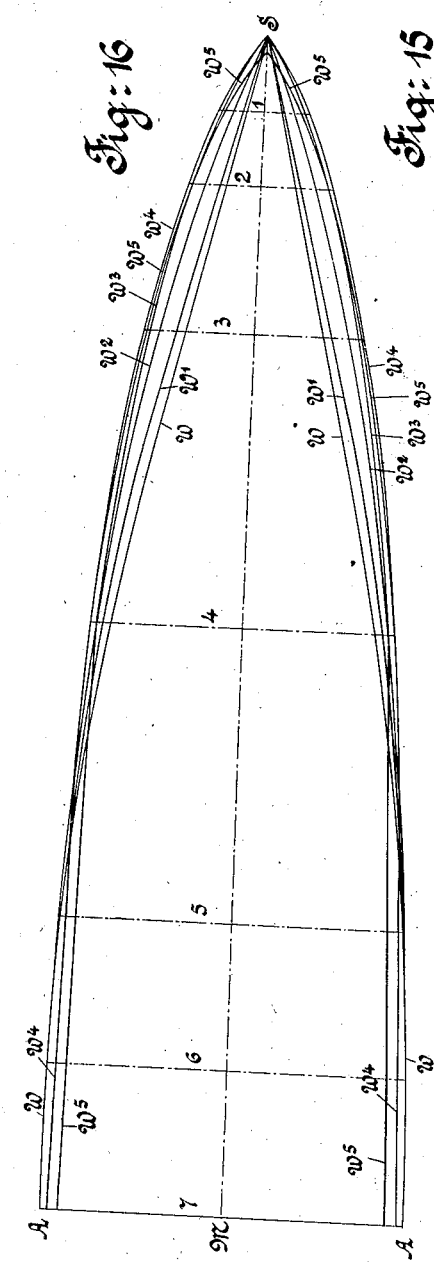
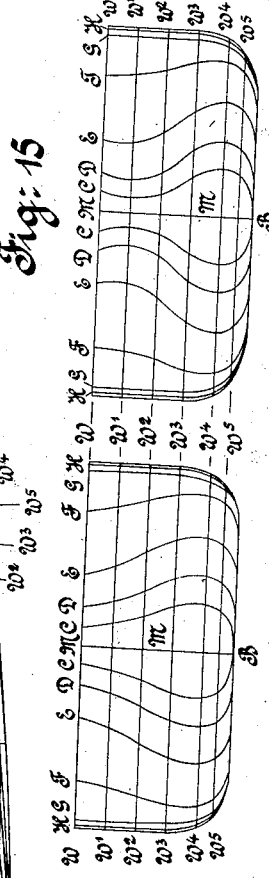
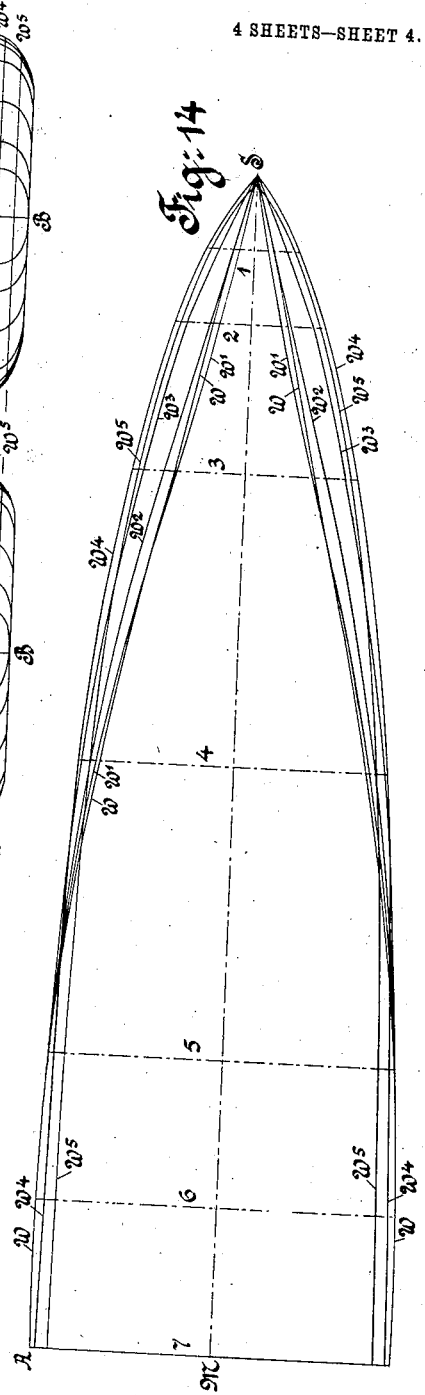
Witnesses:
Max B. A. Doring.
Joseph J. Jacobs.
Inventor:
Helen Clark
Admx of Charles G. Lundborg Dec'd
By her Attorney No. 768,269.

Patented August 23, 1904.

UNITED STATES PATENT OFFICE.

HELEN CLARK, OF WASHINGTON, DISTRICT OF COLUMBIA, ADMINISTRATRIX OF CHARLES G. LUNDBORG, DECEASED.

CONSTRUCTION OF SHIPS.

SPECIFICATION forming part of Letters Patent No. 768,269, dated August 23, 1904.

Application filed October 9, 1902. Serial No. 126,608. (No model.)

*To all whom it may concern:*

Be it known that CHARLES G. LUNDBORG, deceased, late a citizen of the United States, and a resident of Washington, in the District of Columbia, invented new and useful Improvements in the Construction of Ships, of which the following is a specification.

A body moving in a horizontal direction with a certain velocity through the water while entirely submerged below the surface creates but little or no waves and must therefore meet with less resistance to its progress than it would have moving with the same velocity when only partly submerged like a vessel, which must rupture the surface of the water and cause waves of more or less extent, according to its form. As an instance of practical experience it may be mentioned that torpedoes which when first brought into use had the forward end very sharp and pointed, while at the present day, although moving with very much greater speed, they have the forward end far less pointed, being, indeed, of a more "bluff" shape than ordinary cargo-vessels designed for low speed. This well-know physical fact is utilized in the present invention.

As usually designed and constructed the hull of a vessel is formed so as to make its entrance or forward end more sharply pointed near the keel or bottom than at or near the surface of the water. In other words, the water-lines become sharper or their angle of obliquity with the longitudinal middle plane of the vessel larger at or near the load water-line than nearer to the bottom. Hence the areas of the respective water-line planes decrease from or about the load water-line toward the bottom of the vessel, and consequently the volume of displacement of a portion of the hull contained between two water-line planes must be larger than the volume of displacement of another portion of the hull contained between two water-line planes nearer to the bottom of the vessel, the vertical height between the planes of these two portions of the hull being equal, and it follows, therefore, that the displacement of the vessel diminshes as weight is discharged from her in an increasing ratio for each foot of water of her draft as she is lightened; but the deepest always-submerged portion of the hull has comparatively the least resistance, since it creates no waves, and hence it may clearly be concluded that instead of being sharper (having more pointed water-lines with smaller angles of obliquity to the longitudinal vertical middle plane than nearer to the surface) that portion of the hull may in accordance with the physical fact above referred to have a more full or obtuse shape with greater angles of obliquity of its water-lines than nearer to the load water-line, where the surface of the water must be ruptured by the vessel.

In accordance with what has been said the present invention relates to the forward portion of the submerged hull, and in order to more fully describe the invention, the features of which will be specifically pointed out in the claims, reference is had to the accompanying drawings, in which—

Figure 1 represents a side view of the submerged hull of a vessel of the improved construction forward of the greatest transverse section of the vessel; Fig. 2, a plan of the same; Fig. 3, an end view of the same. Fig. 4 represents a side view of the submerged hull forward of the greatest transverse section of a vessel of ordinary construction. Fig. 5 is a plan of the same; Fig. 6, an end view of the same. Fig. 7 represents an outline of the greatest transverse section of the hull at and below the water-line of a vessel of the improved construction and also of ordinary construction. Fig. 8 represents a cross-section of a vessel near the forward end, showing the improved construction in solid lines and the ordinary construction in dotted lines. Fig. 9 represents a similar view taken at a point farther aft. Fig. 10 represents a similar view taken at a point farther aft than Fig. 9. Fig. 11 represents a similar view taken at a point farther aft than Fig. 10. Fig. 12 represents a similar view taken at a point farther aft than Fig. 11. Fig. 13 is a similiar view taken at a point aft of Fig. 12. Fig. 14 represents a plan of the submerged part of a vessel, showing a modified form of the improved construction of vessels. Fig. 15 is an end sectional view of the same. Fig. 16 represents the plan of the submerged part of another modified form of the improved construction of vessels. Fig. 17 is an end sectional view of the same.

In all the figures W is the load water-line.

In Fig. 1 B B S show the outline of the bottom or the deepest part of the hull shown by the drawings with the stem or cut-water S. M B B S represent the longitudinal vertical middle plane of the vessel, and $W'$, $W^2$, $W^3$, $W^4$, and $W^5$ are water-lines at different depths below the load water-line.

In Figs. 2 and 3 the same water-lines are shown under the same denomination as in Fig. 1, and M represents the longitudinal vertical middle plane of the vessel. In Fig. 3 A B A show the outline of the greatest transverse section of the hull below the load water-line on the line 7 of Figs. 1 and 2, and C B C, D B D, E B E, F B F, G B G, and H B H are cross-sections on the lines 1 2 3 4 5 6 of Figs. 1 and 2.

Figs. 4, 5, and 6 show, respectively, similar views of the forward part of the submerged hull of a vessel of ordinary construction having equal dimensions of length, breadth, and depth, equal longitudinal vertical middle plane, and corresponding water-lines of equal depth below the load water-line as my improved hull, as shown in Figs. 1 and 2, and the side views, Figs. 1 and 4, are therefore identical. The greatest transverse section A B A and the load water-line W are also equal for both hulls, while the water-lines $W'$, $W^2$, $W^3$, $W^4$, and $W^5$ and the cross-sections C B C, D B D, E B E, F B F, G B G, and H B H in Figs. 5 and 6 correspond, respectively, to the water-lines and cross-sections of the same denomination in Figs. 2 and 3.

Fig. 7 shows the outline of the greatest transverse section, which is the same for both hulls, on an enlarged scale.

Figs. 8, 9, 10, 11, 12, and 13 show the cross-sections C B C, D B D, E B E, F B F, G B G, and H B H of both hulls on the lines 1, 2, 3, 4, 5, and 6 of Figs. 1, 2, 4, and 5, respectively, also on an enlarged scale, the cross-sections of the improved hull being shown by full lines, while those of the ordinary hull are shown by the dotted lines, and Fig. 13 shows the cross-section H B H of both hulls, also on an enlarged scale, on the line 6 of Figs. 1, 2, 4, and 5, at which point and thence sternward the cross-sections of both hulls coincide and are equal.

By inspecting Fig. 2 it will be seen that the angle of obliquity W S M which the load water-line W forms with the longitudinal vertical middle plane M is smaller or less pointed than the respective angles of obliquity $W'$ S M, $W^2$ S M, $W^3$ S M, $W^4$ S M, and $W^5$ S M which the water-lines $W'$, $W^2$, $W^3$, $W^4$, and $W^5$ form with the said longitudinal middle plane, while it will be seen by inspecting Fig. 5 that the angle of obliquity W S M formed by the load water-line W and the longitudinal vertical middle plane M of the ordinary hull is larger than the respective angles of obliquity formed by the corresponding water-lines of equal denomination, as in Fig. 2, with the said middle plane. In this respect, therefore, my improved system of construction is contrary to that of the ordinary vessel. It will be seen by examining Fig. 2 that the areas of the water-line planes $W'$ S $W'$, $W^2$ S $W^2$, $W^3$ S $W^3$, $W^4$ S $W^4$, and $W^5$ S $W^5$ below the load water-line are respectively larger than the area of the load water-line plane W S W, while, as will be seen by examining Fig. 5, the areas of the corresponding water-line planes of equal denomination as in Fig. 2 below the load water-line are respectively smaller than the area of the load water-line plane W S W. In this respect also the system of construction of my improved hull is contrary to that of the ordinary vessel. It will further be observed by examining Fig. 2 that the areas of the water-line planes of the improved hull increase with greater depth below the load water-line, the area of water-line plane $W^2$ S $W^2$ being larger than the area of water-line plane $W'$ S $W'$, the area of water-line plane $W^3$ S $W^3$ larger than the area of water-line plane $W^2$ S $W^2$, and the area of water-line plane $W^4$ S $W^4$ larger than the area of water-line plane $W^3$ S $W^3$; but by inspecting Fig. 4 it will be seen that the area of the corresponding water-line planes of the ordinary hull of the same denomination as in Fig. 2 decreases with greater depth below the load water-line. In this respect also the system of construction is contrary to that of the ordinary vessel. The areas of the water-line planes of the improved hull being larger than the corresponding water-line planes of the ordinary hull, or the depth or vertical distance between the respective water-line planes being equal for both hulls, it follows that the displacement of the hull must be the largest. This will also clearly appear by inspecting Figs. 8, 9, 10, 11, 12, in which the areas of the cross-sections of the improved hull shown by the full lines are larger than the areas of the corresponding cross-sections of the ordinary hull shown by the dotted lines, the difference between the corresponding areas decreasing sternward toward the greatest transverse section until the cross-sections of the hull coincide with those of the ordinary hull.

It will readily be understood by examining Fig. 3 that the form of the outlines of the cross-sections C B C, D B D, E B E, F B F, G B G, and H B H admits of almost infinite modification and variation with regard to their continuity in the hull above the load water-line and according to the extent, degree of curvature, and relative proportion of their outward concave and convex parts, which must cause corresponding variations in the form of the water-lines. Figs. 14 and 15, which represent a thus-modified plan and end view of the improved hull, will illustrate such variation of sectional outline. The general dimensions of the hull shown by these figures are the same as before, and the longitudinal vertical middle plane being also the same as in Figs. 1 and 4 the side view of this modified hull is therefore equal to and represented by Fig. 1. The load water-line W in Figs. 14 and 15 is the same as in Figs. 2 and 5, and the greatest transverse section A B A in Fig. 15 is the same as in Figs. 3 and 6. By examining Fig. 15 it will be seen that the cross-section C B C on the line 1 of Fig. 1 curves inward below the load water-line toward the longitudinal vertical middle plane M, thus causing the water-line W′, as shown in Fig. 14, to form a smaller angle of obliquity W′ S M with the said middle plane than the angle of obliquity W S W formed by the load water-line W with the said middle plane M. Comparing the cross-section C B C in Fig. 15 with the corresponding cross-section of the same denomination in Fig. 3, it will be observed that the outline of the said cross-section in Fig. 3 does not curve inward toward the said longitudinal middle plane immediately below the load water-line W, as in Fig. 15, but, on the contrary, it curves outward from the said middle plane, thus causing the angle of obliquity W′ S M formed by the water-line W′ and the said middle plane M in Fig. 3 to be larger than the angle of obliquity W S W of the load water-line W, as before shown and stated. As will also be observed by inspecting Fig. 14, the area of the water-line plane W′ S W′ is smaller than the area of the load water-line plane W S W, while, as shown in Fig. 2, the area of the corresponding water-line plane W′ S W′ is larger than the area of the load water-line plane W S W; but, as will be seen in Fig. 15, the outline of the cross-section C B C curves outward from the longitudinal middle plane M below the water-line W′, thus causing, as seen in Fig. 15, the angles of obliquity $W^2$ S M, $W^3$ S M, $W^4$ S M, and $W^5$ S M formed by the water-lines $W^2$ $W^3$ $W^4$ $W^5$ to be larger than the angle of obliquity W S M of the load water-line W, as is the case with the angles of obliquity of the corresponding water-lines of the same denomination in Fig. 2, as before stated, and it will also be seen that the area of the water-line planes $W^2$ S $W^2$, $W^3$ S $W^3$, and $W^4$ S $W^4$ increases with the depth below the load water-line until at water-line $W^4$ the area of the water-line plane is the largest of all the water-line planes forward of the greatest transverse section, and referring to Fig. 15 it will also be seen that the horizontal width of the cross-sections C B C, D B D, E B E, F B F, G B G, and H B H increases from water-line $W^2$ to water-line $W^4$, on which water-line the horizontal width of said cross-sections is the largest, as is similarly the case with the corresponding cross-sections of the same denominations in Fig. 2.

Besides the modification of sectional outline as above described and shown by Figs. 14 and 15 many other similar modifications and variations may, as beforesaid, be made in the application of the system of construction above explained, shown, and described; but no such modifications or variations will prejudice the principle and claims of the invention as hereinafter set forth.

From the above description of the nature of the invention and by examining the figures it will readily be inferred that the continuation of the depth of the hull well forward toward the perpendicular of the load water-line, or, as in ships of war, the carrying forward of the lowest part of the hull even forward of the said perpendicular for the purpose of forming the same is conducive to increased displacement and carrying capacity. It will be observed, however, by examining Figs. 8, 9, 10, 11, 12, and 13 that the outlines of the cross-sections of the hull are of greater length than the outlines of the corresponding cross-sections of the ordinary hull, whence also the immersed surface of the hull must be correspondingly larger, with consequent greater amount of surface friction of the water than that of the ordinary hull. It will be found, however, that the advantages resulting from the possibility of combining very fine or sharply-pointed water-lines near the surface where the water must be ruptured with greater displacement and lower center of gravity which must follow from this invention will largely preponderate in favor of this system of construction, and especially for ships of war the largely-increased carrying capacity gained thereby at points near the extreme forward end of the vessel, where such carrying capacity is much wanted for the weight of armor and materials of construction, will also commend the invention.

Vessels having the areas of the load water-line planes at the water-line smaller than the areas of the water-line planes at points below the load water-line throughout the entire length of the submerged portion of the hull are not new, and that construction is disclaimed, the present invention being expressly limited to the improvements claimed in the construction of the forward part of the greatest transverse section of the hull.

Having thus described the invention, what is claimed is—

1. A ship or vessel in which the angle of obliquity formed by the load water-line, at the stem or cut-water, with the longitudinal vertical middle plane of the vessel is smaller or more sharply pointed than the angle of obliquity formed by all the other water-lines with the said longitudinal middle plane at points below the load water-line.

2. A ship or vessel in which the angle of obliquity formed at the stem or cut-water by the load water-line, or by a water-line below the said load water-line, with the longitudinal vertical middle plane of the vessel, is smaller or more sharply pointed than the angles of obliquity formed at the said stem or cut-water, by all the other water-lines at greater depth below the load water-line with the said longitudinal middle plane such angles of obliquity being enlarged or less pointed with increasing depth below the load water-line.

3. A ship or vessel in which the area of the load water-line plane forward of the greatest transverse section of the hull is smaller than the area of any other water-line planes at points below the load water-line.

4. The hull of a ship or vessel in which the areas of all the water-line planes forward of its greatest transverse section below the load water-line are respectively larger than the area of the load water-line plane forward of the said greatest transverse section; the area of such water-line planes increasing with greater depth below the load water-line until at a depth nearer to the keel or bottom of the vessel such a water-line plane attains a greater area than any other water-line plane forward of the said greatest transverse section.

5. A ship or vessel in which, when in upright position, the horizontal width, at the load water-line, of the transverse vertical sections or cross-sections of a portion of the hull between the forward end or cut-water and the greatest transverse section of the vessel is smaller than the horizontal width of the same cross-sections at all points below the load water-line; from which point downward such horizontal width of the cross-sections increases with the greater depth below the load water-line until at a point nearer to the keel or bottom of the vessel, the said cross-sections attain their greatest horizontal width.

6. A ship or vessel in which, within a portion of its hull between the forward end or cut-water and the greatest transverse section, a part of the area of any vertical transverse section or cross-section of the hull below the load water-line, is smaller than any other part of the area of the same cross-section at greater depth below the load water-line; each one of the said portions of the area of the said cross-section being limited vertically by two water-line planes and having equal vertical height between the said limiting water-line planes.

7. A vessel in which a portion of its displacement forward of its greatest transverse section, contained between and limited, above and below, by two water-line planes below the load water-line, is smaller than any other portion of the said displacement contained between and limited, above and below by two water-line planes at greater depth below the load water-line; the vertical height of the two portions of the said displacement between the limiting water-line planes being equal.

8. A ship or vessel in which horizontal layers or portions of the displacement (the vessel being in upright position) forward of the greatest transverse section, each such layer being contained and limited by water-line planes equally distant from each other, increases in volume with greater depth, from a point at or below the load water-line downward; so that the volume of each such layer or portion of the displacement is larger than the volume of any other layer or portion of the displacement next above, until, at a depth nearer the keel or bottom of the vessel where the area of the water-line plane forming the lower limit of such a layer of the displacement is larger than the area of any other water-line plane forward of the greatest transverse section, the volume of such layer or portion of displacement is larger than any other of the said layers of the displacement.

In testimony that I claim the foregoing as the invention of CHARLES G. LUNDBORG, deceased, I have hereunto subscribed my name this 3d day of September, 1902.

HELEN CLARK,
*Administratrix of the estate of Charles G. Lundborg, deceased.*

In presence of—
JOSEPH W. CRAIG,
J. P. CLARK.